United States Patent [19]
Axelsson et al.

[11] 3,953,981
[45] May 4, 1976

[54] CONNECTING COMPONENTS FOR PILES
[75] Inventors: Bengt Axelsson, Norrahammar; Gunnar Albert Axgärde, Stockholm, both of Sweden
[73] Assignee: Parca-Norrahammar AB, Norrahammar, Sweden
[22] Filed: May 28, 1974
[21] Appl. No.: 474,067

[30] Foreign Application Priority Data
May 28, 1973  Sweden............................ 7307486

[52] U.S. Cl................................... 61/53; 403/336
[51] Int. Cl.²..................... E02D 5/34; E02D 7/00
[58] Field of Search ............. 403/336; 52/722, 726; 61/53, 56

[56] References Cited
UNITED STATES PATENTS
3,356,398   12/1967   Nilsson et al. ................ 61/56 X
3,504,500   4/1970   Fristedt........................ 52/726 X FOREIGN PATENTS OR APPLICATIONS
1,121,111   7/1968   United Kingdom............... 61/53
1,213,357   3/1966   Germany...................... 52/722

Primary Examiner—Werner H. Schroeder
Assistant Examiner—Wayne L. Shedd
Attorney, Agent, or Firm—Holman & Stern

[57] ABSTRACT

A concrete pile joint to be used for joining piles by means of complementary joint members, one of which is fastened to the end of a first pile and the other to the end of a second pile. Each joint member has male and female members constituted of rib portions and branches protruding on a support surface of each joint member. By assembling the joint the rib portions are received within the branches and lock pins inserted into coaxial through holes in both the rib portions and the branches for securing each pair of male and female member.

3 Claims, 12 Drawing Figures

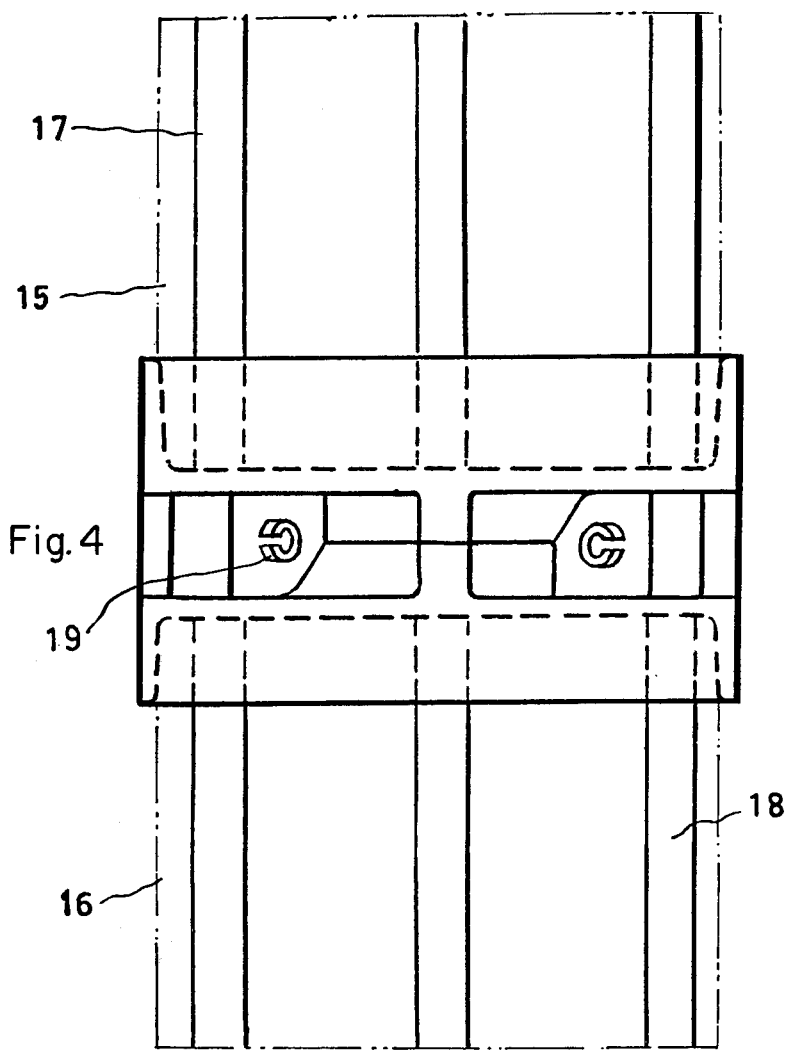

3,953,981

CONNECTING COMPONENTS FOR PILES

BACKGROUND OF THE INVENTION

The present invention relates to a connecting component capable of being secured to a first pile by means of reinforcing bars embedded with the pile, the connecting component being designed to co-operate with a complementary connecting component in another pile which is to be joined to the first pile. With this design, the connecting component comprises a base plate and male elements as well as female elements forming part of the base plate, the elements being capable of operating with corresponding male and female elements, respectively, of the complementary connecting component and of being locked to the corresponding elements by means of securing devices extending in the transverse direction of the pile. In the case of connecting components of this type, it is required, in addition to reliable mechanical strength, for it to be possible that the piles are joined in a rational and economic manner. If, for example, cotters or expansion bolts are used by way of securing devices, it is generally desirable, for instance when ramming piles close to one another, for the securing device to be capable of being fitted from more than one direction. It is also necessary for the connecting components, e.g. of the type in question, to be so designed that a certain degree of automatic alignment is achieved when the piles are guided together. The invention solves, inter alia, the problems to make the insertion of securing devices from several directions possible and to provide a guiding effect to the pile ends when approaching them to each other.

SUMMARY OF THE INVENTION

When two connecting components are placed into a face to face engagement, each pair of coinciding male and female elements is secured by means of cotters or expansion bolts entered into coaxial through holes in both the male and female elements.

BRIEF DESCRIPTION OF THE DRAWING

Some embodiments of pile joints according to the invention are described in the following with reference to the accompanying drawing.

FIG. 4 shows, in vertical view, two co-operating connecting components in the assembled state.

DETAILED DESCRIPTION OF EMBODIMENTS

Figure 3:
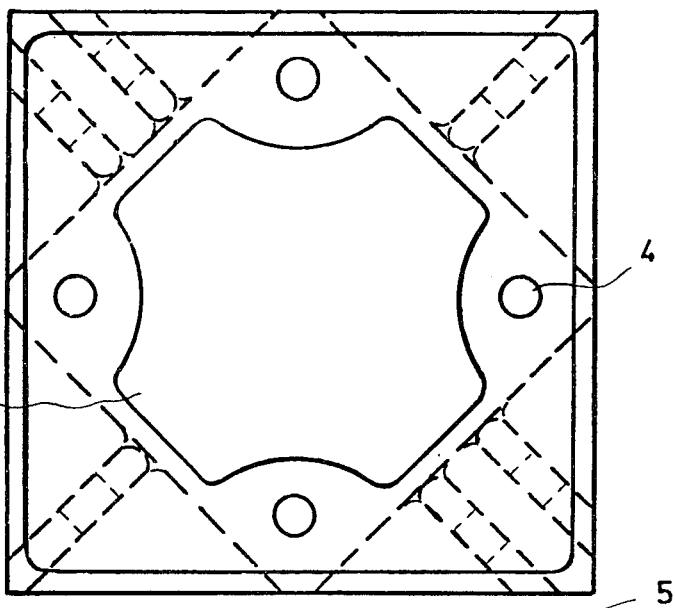
FIG. 3 shows, in plan view and from below, same component as FIG. 1.
Figure 2:
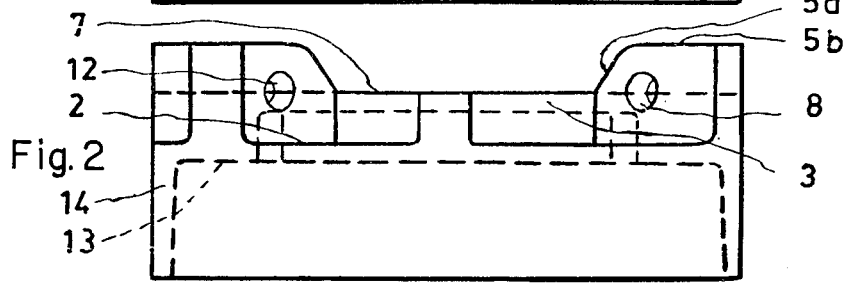
FIG. 2 shows, in side view, the same connecting component as FIG. 1.
Figure 1:
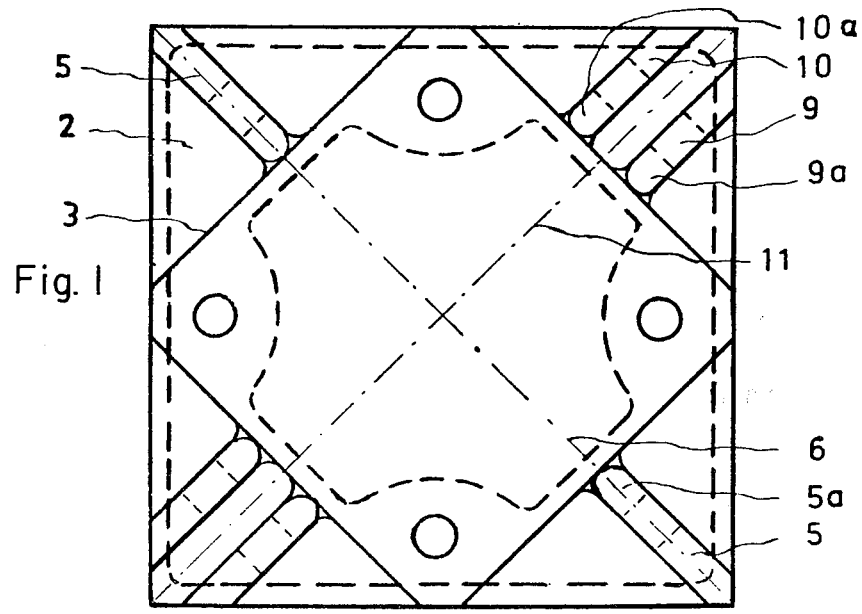
FIG. 1 shows, in a plan view and from above a connecting component.

In FIGS. 1 – 3, a base plate forming part of the connecting component is indicated by 1, and a bridge-shaped unit located on an upper surface 2 of the base plate, by 3. The base plate is provided with four holes 4, through which extend reinforcing bars not shown in FIGS. 1 – 3 and embedded by casting in an actual pile. The holes are thus utilized for securing the connecting component to the pile concerned. The base plate's cross section in the horizontal plane corresponds with the cross section of the pile, which, as a rule, is square.

On the said surface 2 of the base plate are provided male and female elements intended to co-operate with corresponding female and male elements, respectively, of the complementary connecting component located on the pile which is to be assembled with a given pile. The male elements consist, in the present case, of vertically arranged plate-type parts 5 of which there are two, with each of them being located at the outer end of one of two mutually opposite corners of the base plate. The plate-type parts extend along one diagonal 6 so that they are symmetrically divided along their longitudinal directions by the one diagonal. The plate-type parts are provided at their insides with chamfers 5a extending from upper surfaces 5b of the parts 5 down to a contact surface 7 on the bridge-type unit 3. The contact surface 7 is square and designed to serve as an abutment surface for the complementary connecting component, which is accordingly designed with a surface of the same type for abutment against the contact surface 7. The plate-type parts are joined to the bridge-type unit by means of their inner sections at the center sections of the edges of the square surface 7. The plate-type parts 5 are provided with through-holes 8 extending at right angles in respect of the one diagonal 6 of the base plate. Another special characteristic consists in the fact that the height of the parts 5 above the surface 2 of the base plate is roughly twice that of the contact surface 7 above the same surface 2 of the base plate.

The corresponding female elements are designed with two cheeks 9 and 10, which thus extend along and over a given plate-type element 5 of the complementary connecting component.

The corresponding pairs of cheeks are located at the ends of the two remaining opposite base plate corners so that the cheeks of the corresponding pair are situated at both sides of diagonal 11. The cheeks too are provided with chamfers 9a, 10a extending in a manner corresponding to that of the chamfers of the parts 5. The recess between the pair of cheeks is at its inner sections designed in a manner suitable for the guiding together. The extent of the cheeks in the longitudinal direction corresponds to that of the parts 5, and in this connection, it may be stated that the extent of the cheeks and the plate-type parts in the longitudinal direction equals half the extent of the corresponding diagonal, or is somewhat smaller, whereby a clearly defined contact surface 7 is achieved. The height of the cheeks above the surface 2 of the base plate corresponds to that of the parts 5.

Also the cheeks are provided with through-holes 12 extending at right angles in respect of the diagonal 11.

At its other surface 13, the base plate is provided with an edge 14 designed to co-operate with parts of the lateral surfaces of the corresponding pile. The edge concerned extends by 25 – 50 mm over the surface 13.

The connecting component is cast as an integral unit consisting of spherical cast iron and especially suitable securing devices for this purpose are so-called clamping pins of as such known design. However, also locking shafts, cotters, expansion bolts etc. may be used with advantage.

FIG. 4 purports to show two piles joined by means of connecting components in accordance with the invention, whereby a first pile is designated 15 and a second pile is designated 16, with the reinforcing bars in the respective piles being designated 17 and 18, respectively. To secure the connecting components to one another in accordance with FIG. 4, use has been made of clamping pins 19.

Figure 6:
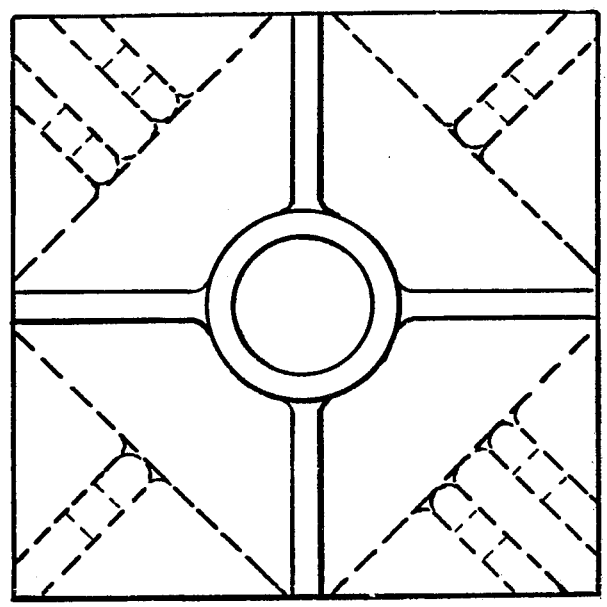
FIG. 6 shows, in plan view, a rock shoe in accordance with FIG. 5.
Figure 5:
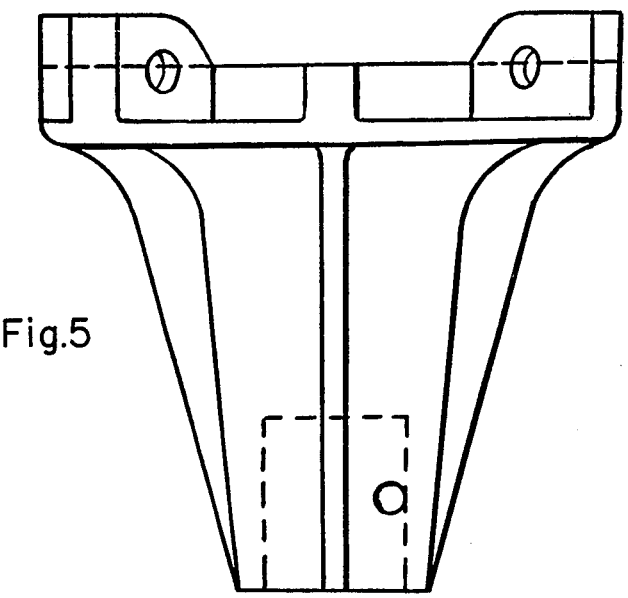
FIG. 5 shows, in vertical view, a rock shoe based on the principle underlying the connecting components according to FIGS. 1 – 4.

FIGS. 5 and 6 purport to show the design of a rock shoe which can be secured to a connecting component in accordance with the invention. Since the present application is not concerned with a rock shoe as such, the latter will not be described in detail in this document.

Figure 8:
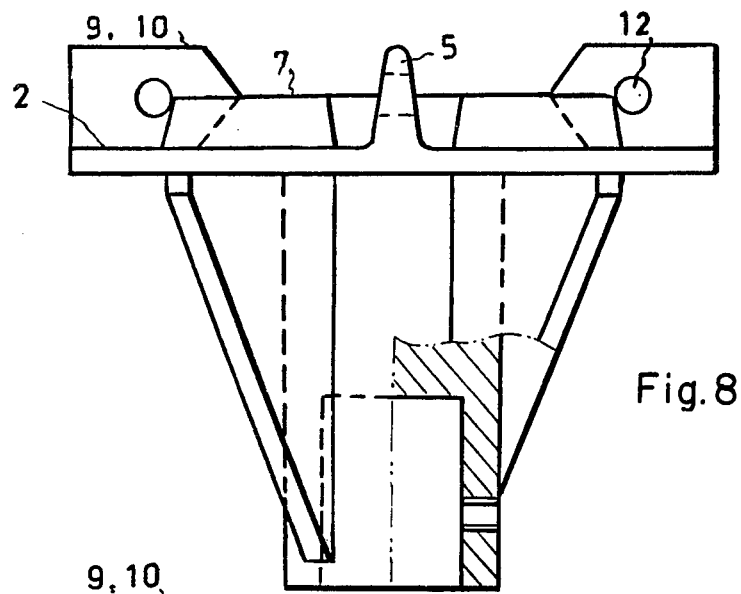
FIG. 8 shows, in vertical view, a variant of a rock shoe.
Figure 7:
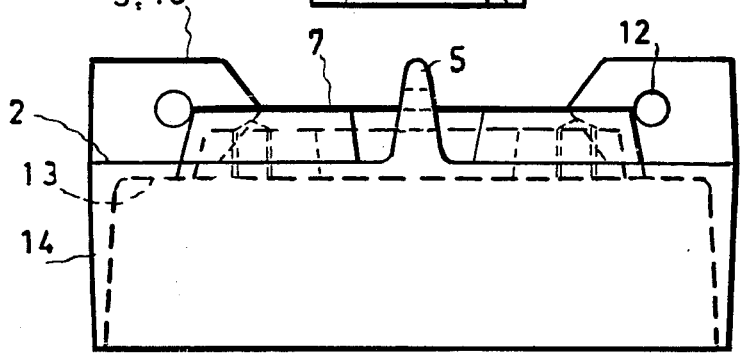
FIG. 7 shows, in side view, a variant of a component as shown in FIG. 1.
Figure 9:
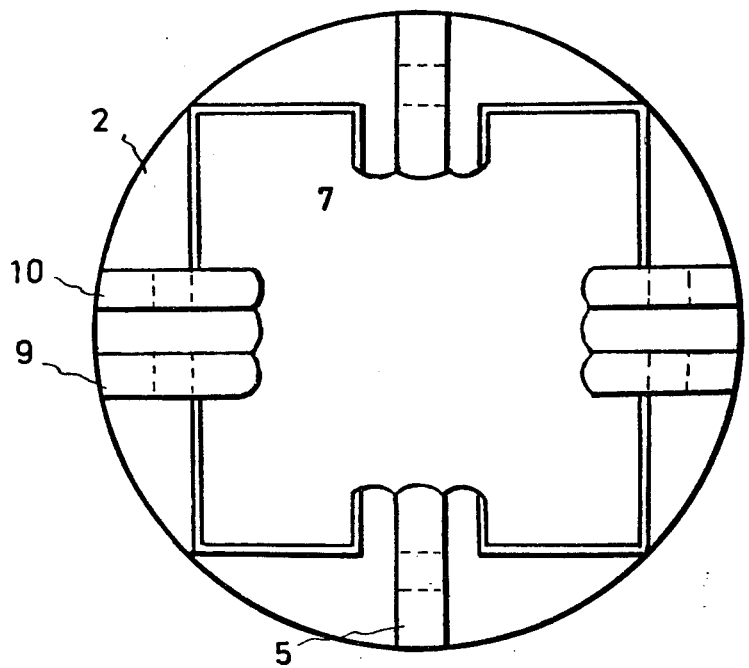
FIG. 9 shows, in plan view from above, the variants of the components shown in FIGS. 7 and 8.

From FIGS. 7 – 9, it appears that the invention is not restricted to square joint members but is also applicable to circular joint members determined for piles with a circular cross section. In analogy to the embodiment in FIGS. 1 – 4, the male members are constituted of rib portions 5 and the female members of the two branches 9 and 10.

Figure 10:
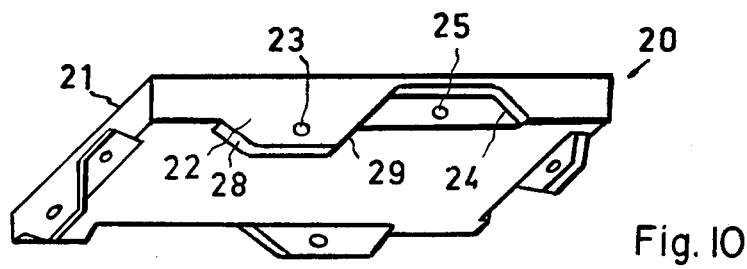
FIG. 10 shows, in a perspective view, another variant of the components shown in FIGS. 1 – 7.

In FIG. 10, there is shown a square-shaped plate or frame as a variant 20 of a joint member adapted to be fastened to the end of a pile with a preferably square cross section. A top surface 21 of the plate abuts flatly to the end surface of the pile and preferably perpendiculary to the longitudinal direction of the pile. The four vertical surfaces of the plate have a special performance as shown in the perspective view in FIG. 10; a protruding lug 22, essentially perpendicular to the top surface of the plate has a through hole 23, and a recess 24 with the same contour as the lug presents a corresponding hole 25 at the bottom of the recess. The location of the lug and the recess is the same on all the vertical surfaces, i.e. turning of the plate through 90°, 180° or 270° will result in the same picture of the vertical surface as shown in FIG. 10.

Figure 11:
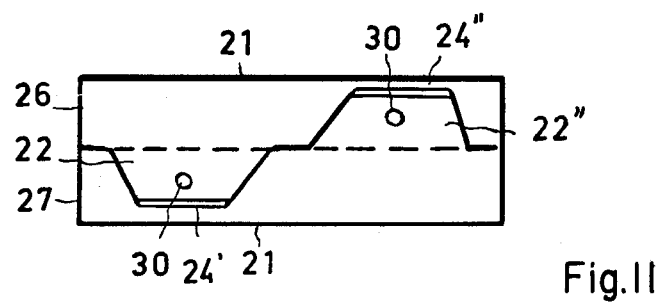
FIG. 11 shows, in vertical view, two assembles components according to FIG. 10.

The purpose of the lug and the recess will appear in FIG. 11 which shows two plates 26, 27 assembled into a joint. Each lug 22' on the plate 26 is sunk into the corresponding recess 24' in the plate 27. In an analogue way, each lug 22'' on the plate 27 is connected to the recesses 24'' in the plate 26. During the assembling of the plates, the flancs 28, 29 of the lug present a guiding means in the corresponding recess. When the plates are completely assembled, the holes 23 in the lugs coincide with the corresponding holes 25 in the recesses 24. As connecting elements, some bolts 30 are used which are entered into the holes from the outside. These bolts, eight in number, keep the pile joint assembled during bending loads and extension strains. The compressive power is essentially taken up by the supporting surfaces of the joint members facing each other.

Figure 12:
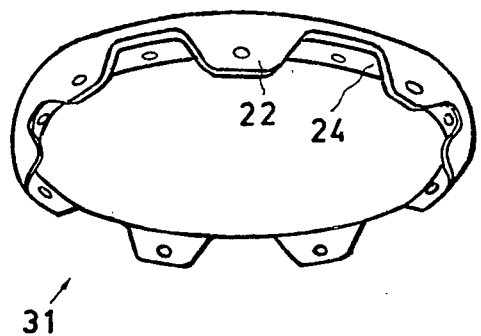
FIG. 12 shows, in a perspective view, a variant of the component according to FIG. 10.

The pile joint may be disconnected as simply as it is connected and the removal of the bolts 30 is simplified, if their outer ends are provided with a hook or threads. From FIG. 12, it appears that the variant according to FIG. 10 is not restricted to square joint members, but is also applicable to circular joint members 31. The periphery of the joint member is alternatively provided with lugs 22 and recesses 24 similarly to the square joint members. The bolts are entered in radial direction through two in an analogous way to the FIG. 11 assembled joint members 31. The number of lugs and recesses on the circular joint member can be varied within wide limits. Obviously, joint members with a great diameter is provided with a great number of lugs and recesses.

As a matter of fact, there are variants of the invention beside the described ones, e.g. to the shape of the joint member. Instead of square or circular, it may be an arbitrary polygon; more or less pairs of lugs and recesses could take place on each vertical surface of the polygonal joint member. The direction of the holes 23, 25 were, in the foregoing, assumed to be perpendicular to the lugs and the bottom surfaces of the recesses but the direction may be inclined to the lugs and the bottom of the recesses, in order to achieve, e.g. better strength properties. The same reason may be quoted for arranging the lugs and the recess bottoms inclined to the vertical surfaces of the polygonal joint member.

What is claimed is:

1. A pile joint comprising a pair of complementary connecting components, each component having male and female elements and a support surface for face to face engagement between the complementary components; the male elements being constituted of plate-type parts protruding substantially perpendicularly on the support surface, and the female elements being constituted of a pair of parallel cheeks protruding substantially perpendicularly on the support surface, said female elements being adapted to receive therebetween either one of the male elements on the complementary component, when the components are placed into the face to face engagement, the plate-type parts being extended along one diameter of the support surface, and the cheeks extended on either side of another diameter crossing the first diameter perpendicularly, and each plate-type part and each cheek having through holes co-axially coinciding in each pair of a male and female element, and a locking shaft inserted in the holes.

2. The pile joint as claimed in claim 1 in which the plate-type parts are positioned outermost at said one diameter and the cheeks outermost at said another diameter.

3. The pile joint as claimed in claim 1 in which the pair of complementary connecting components are identically equal.

\* \* \* \* \*